No. 864,112. PATENTED AUG. 20, 1907.
W. S. SMITH & W. H. EDWARDS.
ELASTIC TIRE.
APPLICATION FILED SEPT. 10, 1906.
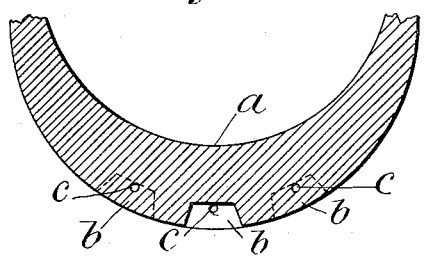
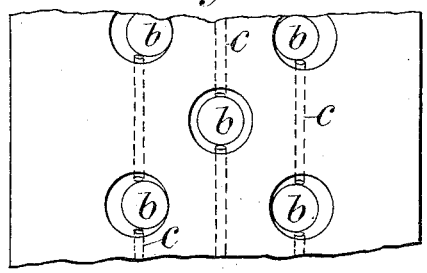
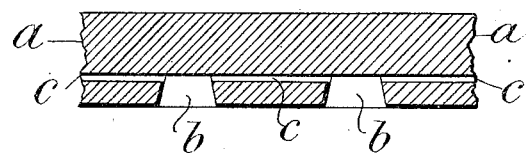
Witnesses.
M. S. Adams.
Paul J. Gathmann.
Inventors.
Willoughby Statham Smith
William Henry Edwards,
By their Attorneys,
Baldwin & Wight.

UNITED STATES PATENT OFFICE.

WILLOUGHBY STATHAM SMITH, OF HYDE PARK PLACE, AND WILLIAM HENRY EDWARDS, OF WALTHAMSTOW, ENGLAND; SAID EDWARDS ASSIGNOR TO SAID SMITH.

ELASTIC TIRE.

No. 864,112.     Specification of Letters Patent.     Patented Aug. 20, 1907.

Application filed September 10, 1906. Serial No. 333,994.

*To all whom it may concern:*

Be it known that we, WILLOUGHBY STATHAM SMITH, gentleman, residing at 12 Hyde Park Place, in the county of Middlesex, England, and WILLIAM HENRY EDWARDS, mechanic, residing at 161 Winns avenue, Walthamstow, in the county of Essex, England, subjects of the King of Great Britain, have invented certain new and useful Improvements in Elastic Tires, of which the following is a specification.

According to this invention the usual studs to prevent slipping are replaced by recesses sunk in the tread, the bottom of such recesses being connected together by a small passage or passages. As the recesses successively come onto the ground the air in them is compressed and is forced through the passages into the adjacent recesses thereby cleaning them.

A convenient way of making the tire is to wrap one or more strings round the body of the tire preferably in a longitudinal direction then placing over the strings a tread perforated with holes and vulcanizing the whole together. The strings are then pulled out through the holes in the tread leaving the desired passages.

The invention is applicable both to the covers of pneumatic tires and to solid tires.

Figure 1 is an underside view, Fig. 2 a transverse section and Fig. 3 a longitudinal section of part of the cover of a pneumatic tire made according to this invention.

$a$ is the cover, $b$ are the recesses in the tread and $c$ are the small passages connecting them. Although the passages $c$ are shown as running circumferentially round the tire they may be arranged in other directions.

It will be observed that the passages, $c$, connect adjacent recesses or cells and that there is no communication between said passages and the open air except through the cells, therefore as the recesses or cells successively come onto the ground the air in them is compressed and is forced through the passages into the adjacent recesses, thereby forcing out mud, etc., from the latter and keeping them clean.

What we claim is:—

An elastic tire having an integral tread portion formed with recesses or cells open at the outer surface of the tire but closed at the bottom and which cells are connected together by small tubular passages having no connection with the open air except through said cells.

WILLOUGHBY STATHAM SMITH.
WILLIAM HENRY EDWARDS.

Witnesses:
H. D. JAMESON,
A. NUTTING.